(12) United States Patent
Van Der Hoek

(10) Patent No.: US 11,221,264 B2
(45) Date of Patent: Jan. 11, 2022

(54) OPTICAL FIBER SENSING DEVICE FOR SENSING THE DISTRIBUTION OF THE COMPRESSION OR DEFORMATION OF A COMPRESSIBLE OR DEFORMABLE ELEMENT

(71) Applicant: Compass Instruments (CI) B.V., Rotterdam (NL)

(72) Inventor: Marinus Jacobus Van Der Hoek, Rotterdam (NL)

(73) Assignee: Compass Instruments (CI) B.V., Rotterdam (NL)

( * ) Notice: Subject to any disclaimer, the term of this patent is extended or adjusted under 35 U.S.C. 154(b) by 81 days.

(21) Appl. No.: 16/628,615

(22) PCT Filed: Jul. 4, 2018

(86) PCT No.: PCT/NL2018/050432
§ 371 (c)(1),
(2) Date: Jan. 3, 2020

(87) PCT Pub. No.: WO2019/009711
PCT Pub. Date: Jan. 10, 2019

(65) Prior Publication Data
US 2021/0131889 A1    May 6, 2021

(30) Foreign Application Priority Data

Jul. 4, 2017 (NL) .................................. 2019167

(51) Int. Cl.
*G01L 1/24* (2006.01)

(52) U.S. Cl.
CPC .................................. *G01L 1/246* (2013.01)

(58) Field of Classification Search
CPC . G01D 21/02; G01B 7/16; G01K 7/16; G01L 1/16; G01P 15/0802

(Continued)

(56) References Cited

U.S. PATENT DOCUMENTS 6,776,045 B2    8/2004  Fernald et al.
8,676,008 B2 *  3/2014  Grosso ................... G01V 1/186
                                                        385/37

(Continued)

FOREIGN PATENT DOCUMENTS

DE        69513937 T2     7/2000
WO     2011120147 A1    10/2011
WO     2015167340 A1    11/2015

*Primary Examiner* — Octavia Hollington
(74) *Attorney, Agent, or Firm* — Suiter Swantz pc llo

(57) ABSTRACT

The invention relates to an optical fiber sensing device (1) for sensing the distribution of the compression/deformation of a compressible/deformable element (2), comprising: an incompressible/undeformable tubular element (3) with a recess (4) extending in a length direction (X) thereof, the recess being enclosed by the tubular element, an optical fiber (5) arranged in the recess, comprising one or more light distortion structures (6), and being expandable in the length direction of the recess, one or more expandable elements (8), having a higher compressibility/deformability than the tubular element in a transverse direction (Y), arranged at one or both ends (9) of the tubular element, the optical fiber being enclosed in the expandable elements, which are arranged for expanding/contracting in the length direction, along with the optical fiber, when the expandable elements are subjected to a transverse load (F).

20 Claims, 3 Drawing Sheets

(58) Field of Classification Search
USPC .......................................................... 7/514.34
See application file for complete search history.

(56) References Cited

U.S. PATENT DOCUMENTS

| | | | |
|---|---|---|---|
| 8,805,128 B2* | 8/2014 | Wild | G01K 11/3206 |
| | | | 385/12 |
| 2002/0009252 A1* | 1/2002 | Maron | G01L 1/246 |
| | | | 385/12 |
| 2004/0182166 A1 | 9/2004 | Jones et al. | |
| 2014/0321799 A1* | 10/2014 | Udd | G01L 1/243 |
| | | | 385/13 |

* cited by examiner

OPTICAL FIBER SENSING DEVICE FOR SENSING THE DISTRIBUTION OF THE COMPRESSION OR DEFORMATION OF A COMPRESSIBLE OR DEFORMABLE ELEMENT

FIELD OF THE INVENTION

The present invention relates to an optical fiber sensing device for sensing the distribution of the compression or deformation of a compressible or deformable element, an optical fiber sensing system comprising such an optical fiber sensing device, an optical fiber sensing assembly comprising such an optical fiber sensing device or such an optical fiber sensing system, as well as a method for sensing a pressure distribution, preferably for calibrating and sensing a pressure distribution, in a compressible or deformable element, using such an optical fiber sensing assembly.

BACKGROUND OF THE INVENTION

Such optical fiber sensing devices are known from the prior art. For instance, U.S. Pat. No. 7,405,818 B2 discloses a seal for preventing leakage of fluid from between a first member and a second member has a seal body and a seal wear indicator. The second member is capable of moving toward and away from the first member. The seal body is adapted for engaged contact with the first and second members so as to prevent leakage of fluid as long as the seal has not worn beyond a specified depth. A seal wear indicator is positioned within the seal body at approximately the specified depth, such that when the seal has worn to the specified depth, a change in the optical conductor is detected, indicating that the seal needs replacement.

U.S. Pat. No. 5,684,297 A discloses a method of detecting and/or measuring changes in a physical magnitude by means of a distributed sensor, wherein changes are detected and/or measured at a plurality of "measurement" points along the sensor. The sensor comprises an optical fiber having an optical core for guiding the majority of light waves, wherein the optical core includes a plurality of diffraction gratings distributed along said optical fiber. The diffraction gratings are each situated at one of the measurement points and all have substantially the same central reflection wavelength in the absence of strain.

Furthermore, from public prior use so-called "intelligent gaskets" are known using optical technology incorporating light distortion structures, such as fiber Bragg gratings (FBG's), for usage, condition and integrity monitoring, as well as state determination, of gaskets, enabling predictive maintenance, for instance at places where pipes are connected, in order to prevent leakages, spillage, and other forms of uncontrolled pollution.

A problem with the known optical fiber sensing devices, however, is that it is very difficult to accurately measure the amount of compressive force being exerted on the optical fiber (cable). The optical sensing devices according to the state of the art in practice can only sense that some change in pressure on the optical fiber has occurred due to a shift in the wavelength reflected by the light distorting structure or by a change in the state of polarization caused by non-radial deformation of the light distortion structure, both being observed by a light sensor as a result of compression or deformation of the light distortion structure.

A further problem with the known optical fiber sensing devices is that it is next to impossible to verify the direction of the compressive forces being exerted on the optical fiber. The known optical fiber sensing devices merely sense that there is some radial force being exerted on the optical fiber, but not from which (angular) direction the force is applied. However, such information is highly critical for predicting the integrity and possible failure of the compressible or deformable element, in particular when the compressible or deformable element is a gasket.

OBJECT OF THE INVENTION

An object of the invention is therefore to provide an optical fiber sensing device for sensing the distribution of the amount of compression or deformation of a compressible or deformable element, wherein the amount of compression or deformation of the compressible or deformable element can be accurately determined from the change in the light passing through or reflected from the light distortion element in the optical fiber.

A further objection of the invention is thus to provide an optical fiber sensing device for sensing a pressure distribution in a compressible or deformable element, wherein the direction of the compressive forces being exerted on the optical fiber can be more accurately verified.

DESCRIPTION OF THE INVENTION

Hereto, according to the invention, an optical fiber sensing device for sensing the distribution of the compression or deformation of a compressible or deformable element is provided, comprising:

a substantially incompressible or undeformable tubular element with a recess extending in a length direction of the tubular element, the recess being enclosed by the tubular element, an optical fiber arranged in the recess, the optical fiber comprising one or more light distortion structures, such as a fiber Bragg grating, and being expandable in the length direction of the recess, one or more expandable elements, having a higher compressibility or deformability than the tubular element in a transverse direction, arranged at one or both ends of the tubular element, the optical fiber being enclosed, such as embedded, in the expandable elements, the expandable elements being arranged for expanding or contracting in the length direction, along with the optical fiber, when the expandable elements are subjected to a transverse load.

The inventor has shown the insight that compression or deformation of the optical fiber (cable) itself (and thus the lengthening/contraction thereof) has a major influence on the measurement results. Due to the presence of the one or more expandable elements at one or both ends of the optical fiber cable, the lengthening/contraction of the expandable elements and optical fiber (cable) can be correlated to shifts in the wavelength of the light reflected by the one or more light distortion structures, being measured by the light sensor. The magnitude of the shift in wavelength can be tuned by various means, e.g. by variation of the length of the expandable element. Therefore, the optical fiber (cable) sensing device can be more accurately "tuned" to the required range of compression or deformation to be measured, and can thus be configured to deliver (much more) accurate measurement results. The inventor, for instance, foresees tuning the optical fiber sensing device by adjusting Young's modulus of elasticity (of the one or more expandable elements) within various ranges. The one or more expandable elements could have a cylindrical shape, a frustoconical shape, or even a balloon shape.

Essentially, the inventor has keenly observed that drawbacks of radial compression or deformation of light distortion structures are mainly attributable to inhomogeneous distortion of the reflection spectrum of the light distortion structure (e.g. an FBG) due to non-circular distortion of the fiber core cross-section holding the FBG or other light distortion structure or non-circular distortion of the refractive index ellipsoid of the fiber core, resulting in a shift in wavelength of the reflected light with the polarization state of the light impinging on the FBG or other light distortion structure. Both of the aforementioned effects result in a measurement error. In a more general sense, the skilled person will understand that distortion of the light spectrum is basically due to inhomogeneous axial strain distribution or non-circular deformation of the refractive index distribution over the cross section of the light distortion structure. The present invention isolates the light distortion structure from radial compressive forces, thus eliminating the above drawbacks, and eliminates inhomogeneous strain along the length direction along which the fiber is enclosed. The previous paragraph basically best describes the inventive concept underlying the invention, i.e. radial compression or deformation of the expandable elements results in homogeneous strain of the optical fiber (wherein, as described, the one or more light distortion structures and the optical fiber, along the length direction along which the fiber is enclosed, are isolated from such radial compression or deformation).

The inventor notes that the invention described in this patent application can advantageously be used to build, for instance, one or more light distortion structure-based temperature sensors as to compensate the measured compression or deformation for the effect of temperature on the mechanical properties of the compressible or deformable material, the detection of the passage of a liquid or gas through the compressible or deformable material or the detection of the presence of a liquid or gas in the compressible or deformable material. Other advantageous uses are, for instance, the measurement of vibrations in the compressible or deformable material/element, or the measurement of leaks (which would result in a reduction in compression or deformation of the—e.g. pre-compressed or pre-deformed—expandable elements). The invention can also be advantageously used with webbings or laminates.

Of course, multiple optical sensing devices according to the invention can be installed in one compressible or deformable element. Also, multiple compressible or deformable elements can each be provided with one or more optical sensing devices, wherein sensing information can be obtained from the multiple compressible or deformable elements. Combining the aforedescribed configurations is, of course, also conceivable.

In the context of the present patent application 'compressive (or deformative) forces' should generally be read to include both 'compressive forces' as well as 'decompressive forces' (basically 'compressive forces' with a negative sign, or 'undeformative' forces, i.e. 'relaxing' forces). 'Tubular element' should be read as an elongated element having a hollow interior for housing the optical fiber.

An embodiment relates to an aforementioned optical fiber sensing device, wherein the tubular element is made of metal. Metal is relatively strong and incompressible or undeformable, as well as durable, yet relatively easy to process.

An embodiment relates to an aforementioned optical fiber sensing device, wherein the expandable elements are made of a silicone material. Such a silicone material is relatively flexible/compressible/deformable, water-repellent, resistant to extreme temperatures, shows relatively consistent compression or deformation properties and has low chemical reactivity. Alternatively, a rubber or rubber-like material could also be used (wherein the one or more expandable elements are, for instance, vulcanized to the optical fiber, or wherein the one or more expandable elements are vulcanized to further force transfer elements, i.e. elements which transfer forces due to compression or decompression of the one or more expandable elements to the optical fiber). Preferably, the choice of material of the one or more expandable elements leads to a Poisson ratio of about 0.3-0.5, such as about 0.4-0.5. The material could for instance comprise polystyrene, which has a Poisson ration of 0.34.

An embodiment relates to an aforementioned optical fiber sensing device, wherein one or more optical fiber sections protruding from one or both ends of the tubular element are embedded in the one or more expandable elements.

An embodiment relates to an aforementioned optical fiber sensing device, wherein, in an uncompressed or undeformed state, the one or more expandable elements have a diameter, i.e. in a plane perpendicular to the length direction, greater than the diameter of the tubular element. This diameter can be tuned/configured, of course, to the expected pressures or forces to be measured.

An embodiment relates to an aforementioned optical fiber sensing device, wherein the light distortion structure is arranged in the interior of the tubular element. Thus, the light distortion structure is effectively isolated from compressive forces by the tubular element, and, generally speaking, inhomogeneous straining forces.

An embodiment relates to an aforementioned optical fiber sensing device, wherein the expandable elements have a tubular shape.

An embodiment relates to an aforementioned optical fiber sensing device, wherein one or more force transfer elements are fixed to the optical fiber, arranged adjacent to and in contact with one or more outer (longitudinal) ends of the one or more expandable elements to aid with transferring the expansion or contraction by the expandable elements in the length direction to the optical fiber when the expandable elements are subjected to the transverse load (F). The one or more force transfer elements could take the form of end caps, end knobs, end rings, or the like. The one or more force transfer elements could also actually be fixed to the outer ends of the expandable elements. It is even conceivable that a major portion of the expansion or contraction force is exerted on the optical fiber by the force transfer elements as opposed to such an expansion or contraction force being exerted directly on the optical fiber by the expandable elements.

An embodiment relates to an aforementioned optical fiber sensing device, wherein the one or more force transfer elements are substantially incompressible or undeformable to prevent inaccurate measurements relating to the expansion or contraction of the expandable elements (i.e. possible additional, unwanted expansion or contraction by the force transfer elements themselves).

An embodiment relates to an aforementioned optical fiber sensing device, wherein the one or more force transfer elements are made of metal.

Another aspect of the invention relates to an optical fiber sensing system comprising:
an aforementioned optical fiber sensing device,
a light source connected to one end of the optical fiber, a light sensor connected to the one end of the optical fiber, for measuring the wavelength or power reflected or transmitted by the one or more light distortion structures.

An embodiment relates to an aforementioned optical fiber sensing assembly of an aforementioned optical fiber sensing device or an aforementioned optical fiber sensing system, and a compressible or deformable element, such as a gasket or a seal, or a structural element, such as a flange of a pipe or a duct, wherein the optical fiber sensing device is arranged in the compressible or deformable element or the structural element in such a way, that the pressure distribution in a direction transverse to a length direction of the optical fiber sensing device is measured. The actual pressure could then be exerted on the optical fiber sensing device by the compression or deformation of the compressible or deformable element itself, or, when arranged in a structural element, by any pressure exertion means external to the structural element. The compressible or deformable element in a broad sense could for instance also be a tire, an aircraft fuselage, or any other compressible or deformable element wherein a degree of compression or deformation is to be measured. As stated, the optical fiber sensing device could also be arranged in any other structural element, which could be substantially incompressible of undeformable, wherein a pressure or force exerted on the structural element is to be measured, such as bridge joints.

An embodiment relates to an aforementioned optical fiber sensing assembly, wherein the compressible or deformable element is a gasket or seal, such as the gasket arranged at a manhole or a flange. The inventor has found that in particular with gaskets the invention has enormous potential for determining the pressure distribution in the gasket, making it much easier to predict remaining lifespan and possible failure of the gasket.

An embodiment relates to an aforementioned optical fiber sensing assembly, wherein the gasket is a non-metallic gasket. The optical fiber sensing device according to the invention in practice appears particularly sensitive and accurate when measuring pressure variations in non-metallic gaskets. Of course, the optical fiber sensing device according to the invention can also be used with metallic or hybrid gaskets.

An embodiment relates to an aforementioned optical fiber sensing assembly, wherein the one or more expandable elements are arranged at one or more critical locations in the compressible or deformable element, such as locations prone to failure under a compressive load.

As stated before, an embodiment relates to an aforementioned optical fiber sensing assembly, wherein the structural element is substantially incompressible or undeformable.

An embodiment relates to an aforementioned optical fiber sensing assembly, wherein the optical fiber sensing device is arranged in a surface groove of the compressible or deformable element or in a surface groove of the structural element, such that a pressure or force exerted at the surface of the structural element can be measured.

An embodiment relates to an aforementioned optical fiber sensing assembly, wherein, in the transverse direction (Y), the one or more expandable elements extend beyond a surface in which the surface groove is arranged. The skilled person will understand, that, depending on the application the one or more expandable elements could also be flush with the surface, or even be recessed with respect to the surface (i.e. lying below surface level).

An embodiment relates to an aforementioned optical fiber sensing assembly, wherein the surface groove, when viewed in a direction perpendicular to the surface, has the shape of a ring or a portion of a ring.

Another aspect relates to a connection assembly of a first connection member, a second connection member and an aforementioned optical fiber sensing assembly, wherein the first and second connection members are connected to each other by means of connection means, such as bolts, wherein the compressible or deformable element of the optical fiber assembly is arranged between the first and second connection members to provide a fluid-tight or air-tight seal there between.

An embodiment relates to an aforementioned connection assembly, wherein the one or more expandable elements are arranged at those locations in the compressible or deformable element, where the compressible or deformable element is compressed or deformed by the connection means.

An embodiment relates to an aforementioned connection assembly, wherein the structural element is constituted by the first connection member or the second connection member and the one or more expandable elements are arranged at those locations in the structural element, where the compressible or deformable element is compressed or deformed by the connection means.

Another aspect of the invention relates to a method for sensing the distribution of the compression or deformation of a compressible or deformable element, using an aforementioned optical fiber sensing assembly, comprising the steps of:

measuring one or more reflection wavelengths of the one or more light distortion structures, with the compressible or deformable element, the optical fiber and the expandable elements in an uncompressed or undeformed state, measuring one or more reflection wavelengths of the one or more light distortion structures, with the compressible or deformable element, the optical fiber and the expandable elements in a compressed or deformed state, correlating the expansion of the optical fiber and/or the expandable elements in the length direction with the changes in the one or more reflection wavelengths with respect to the one or more reflection wavelengths of the one or more light distortion structures.

BRIEF DESCRIPTION OF THE DRAWINGS

The present invention will be explained hereafter with reference to exemplary embodiments of an optical fiber sensing device according to the invention and with reference to the drawings. Therein.

DETAILED DESCRIPTION

Figure 1:
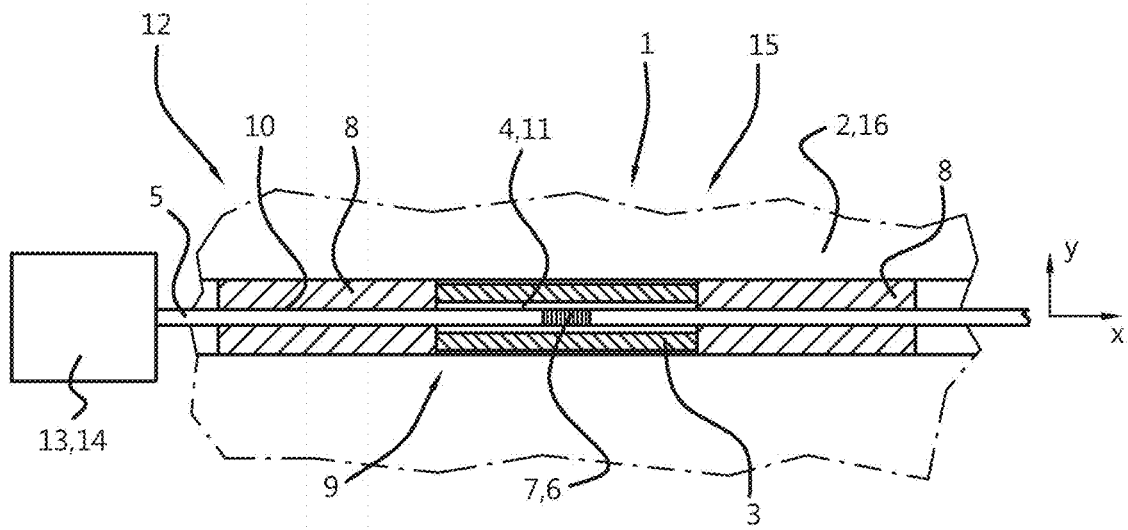
FIGS. 1 and 2 show an exemplary embodiment of an optical fiber sensing device according to the invention, embedded in a compressible or deformable material (i.e. a longitudinal cross-section and a transverse cross-section are shown, respectively)
Figure 2:
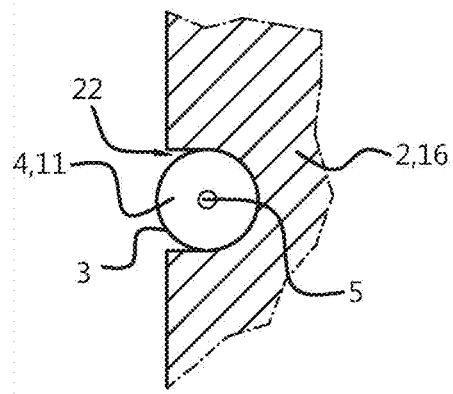
Figure 3:
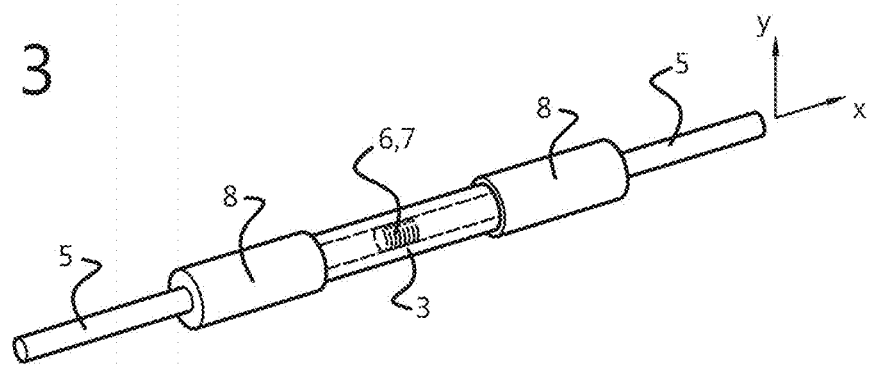
FIG. 3 shows a schematic, perspective view of an exemplary embodiment of the optical fiber sensing device.

FIGS. 1-9 will be discussed in conjunction. An optical fiber sensing device 1 is shown for sensing the distribution of the compression or deformation of a compressible or deformable element 2, such as a gasket 16, for instance a non-metallic gasket 16. The gasket 16 can for example have a relatively flat form, such as a ring-shape. The gasket 16, or the compressible or deformable element 2 in general, can be made from a flat material, a sheet, such as paper, rubber, silicone, metal, cork, felt, neoprene, nitrile rubber, fiberglass, polytetrafluoroethylene (otherwise known as PTFE or Teflon) or a plastic polymer (such as polychlorotrifluoroethylene).

The optical fiber sensing device 1 comprises a substantially incompressible or undeformable tubular element 3 with a recess 4 extending in a length direction X of the tubular element 3. The recess 4 is fully enclosed by the tubular element 3. Preferably, the tubular element 3 is made of metal. Other materials can also be chosen, as long as the material is relatively incompressible or undeformable, in particular when compared to the compressibility/deformability of the expandable elements 8. In the case of a (flat) gasket 16 or, in general, a relatively flat compressible or deformable element 2, the optical fiber sensing device 1 is preferably arranged in the plane of the gasket 16, i.e. the length direction X is parallel to the plane of the gasket 16. The optical fiber sensing device 1 can furthermore be arranged in a groove 22 in or at an outer surface of the compressible or deformable element 2.

An optical fiber 5 is arranged in the recess 4, in the interior 11 of the tubular element 3. The optical fiber 5 comprises one or more light distortion structures 6, such as a fiber Bragg grating 7. In principle, the light distortion structure 6 could also comprise or be formed by a 'gap', i.e. a physical interruption or discontinuity in/of the optical fiber 5. The optical fiber 5 is expandable or moveable in the length direction X of the recess 4. The optical fiber 5 preferably provided with a protective coating or the like to protect the fragile optical fiber 5. The inventor notes that in some cases the protective coating, jacket or the like can actually be critical for improving or optimizing the performance of the 'compression-to-strain' mechanism underlying the invention. The inventor prefers to refer to such a fiber as a 'sensing-optimized jacketed fiber'.

Figure 5:
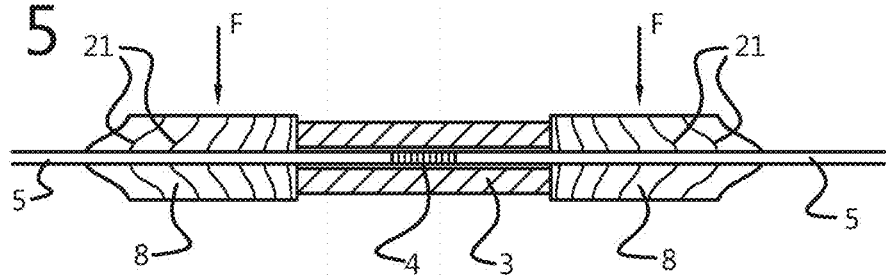

The optical fiber sensing device 1 comprises one or more expandable elements 8. The expandable elements 8 have a higher (elastic) compressibility than the tubular element 3 in the transverse direction Y. The expandable elements 8 are arranged at one or both ends 9 of the tubular element 3. The optical fiber 5 is embedded in the expandable elements 8 such that the optical fiber 5 is pulled along in the length direction X when the expandable elements 8 are compressed or deformed in the transverse direction Y. The expandable elements 8 in general are arranged for expanding or contracting in the length direction X, along with the optical fiber 5, when the expandable elements 8 are subjected to a transverse load F as shown in FIG. 5. FIG. 5 shows the lines of deformation 21 of the expandable elements 8 induced by the compression or deformation of the compressible or deformable element 2.

The expandable elements 8 are preferably made of a silicone material. Preferably, the expandable elements 8 have a tubular shape, similar to the tubular element 3.

As shown in FIG. 1, preferably one or more optical fiber sections 10 protruding from one or both ends 9 of the tubular element 3 are embedded in the one or more expandable elements 8.

Figure 4:
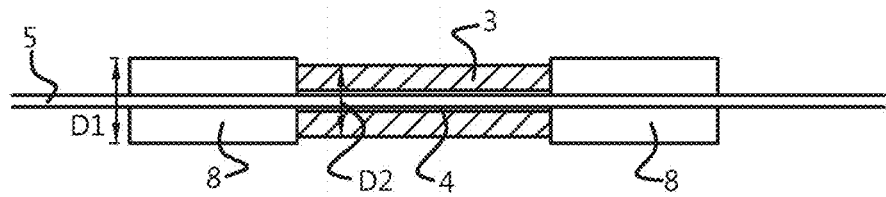
FIGS. 4 and 5 show an exemplary embodiment of an optical fiber sensing device according to the invention, in an uncompressed or undeformed state and a compressed or deformed state, respectively.

As shown in FIG. 4, in an uncompressed or undeformed state, the one or more expandable elements 8 have a diameter D1, i.e. in a plane perpendicular to the length direction X, greater than the diameter D2 of the tubular element 3. D1 could for instance amount to 1.1-1.5 times D2, depending on the application and pressures to be measured. For most applications, D2 will be selected to lie between 1 mm and 10 mm, such as between 2 mm and 8 mm, although smaller/larger diameters D2 are conceivable. The length of the optical fiber sensing device 1 up to and including the expandable elements 8 will range from 10 mm to 100 mm, such as 15 mm to 75 mm, for most practical purposes. The ratio of the length of one of the expandable elements 8 relative to the length of the tubular element 3 could for instance be chosen to lie between 1:10 and 1:2, such as 1:3 and 1:6 for optimal expansion/contraction properties of both the optical fiber 5 and the expandable elements 8.

FIG. 1 shows an optical fiber sensing system 12 comprising:
an optical fiber sensing device 1 as described above,
a light source 13 connected to one end of the optical fiber 5, and
a light sensor 14 connected to the one end of the optical fiber 5, for measuring the wavelength reflected by the one or more light distorting structures 6.

FIG. 1 also depicts an optical fiber sensing assembly 15 of an optical fiber sensing device 1 as described above or an optical fiber sensing system 12 as described above, and a compressible or deformable element 2, wherein the optical fiber sensing device 1 is arranged in the compressible or deformable element 2 in such a way, that the pressure distribution in a direction Y transverse to a length direction X of the optical fiber sensing device 1 is measured. The optical fiber sensing device 1 can for instance be arranged in a groove 22, as mentioned before, or any similar type of preformed channel.

The one or more expandable elements 8 are preferably arranged at one or more critical locations in the compressible or deformable element 2, such as locations prone to failure under a compressive load.

Figure 6:
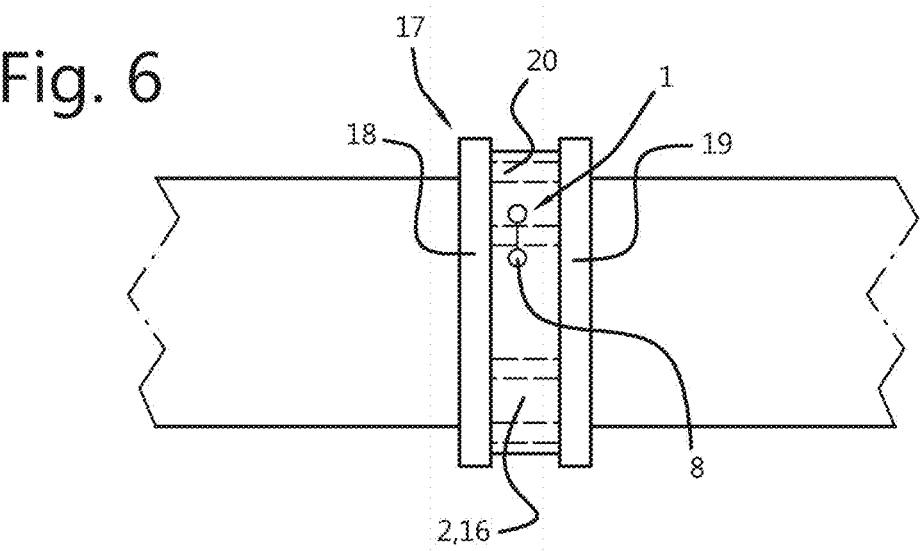
FIG. 6 shows a connection assembly of a first connection member, a second connection member and an aforementioned optical fiber sensing assembly.

FIG. 6 shows a connection assembly 17 of a first connection member 18, such as a first pipe section with a first flange, a second connection member 19, such as a second pipe section with a second flange, and an optical fiber sensing assembly 15 as described above, wherein the first and second connection members 18, 19 are connected to each other by means of connection means 20, such as bolts. The compressible or deformable element 2, in casu the gasket 16, of the optical fiber assembly 15 is arranged between the first and second connection members 18, 19 to provide a fluid-tight or air-tight seal there between. The one or more expandable elements 8 are arranged at those locations in the compressible or deformable element 2, where the compressible or deformable elements 8 are compressed or deformed by the connection means 20, for instance the bolts.

As mentioned before, the invention also relates to a method for sensing the distribution of the compression or deformation, preferably for calibrating and sensing a pressure distribution, of a compressible or deformable element 2, using an optical fiber sensing assembly 15 as described above, comprising the steps of:

measuring one or more reflection wavelengths of the one or more light distortion structures 6, with the compressible or deformable element 2, the optical fiber 5 and the expandable elements 8 in an uncompressed or undeformed state, measuring one or more reflection wavelengths of the one or more light distortion structures 6, with the compressible or deformable element 2, the optical fiber 5 and the expandable elements 8 in a compressed or deformed state, correlating the expansion of the optical fiber 5 and/or the expandable elements 8 in the length direction X with the changes in the one or more reflection wavelengths with respect to the one or more reflection wavelengths of the one or more light distortion structures 6. Alternatively, a first compression or deformation state can be compared to a second compression or deformation state.

Figure 7:
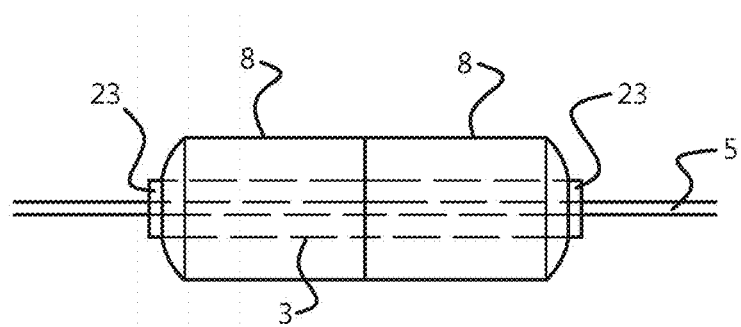
FIG. 7 shows a schematic view of an exemplary embodiment of the optical fiber sensing device with force transfer elements in the form of ends caps.

FIG. 7 shows an exemplary embodiment of the optical fiber sensing device 1 with force transfer elements 23 in the form of ends caps. The end caps 23 are fixed to the optical fiber 5 and are furthermore arranged adjacent to and in contact with one or more outer ends 24 of the one or more expandable elements 8 to aid with transferring the expansion or contraction by the expandable elements 8 in the length direction to the optical fiber 5 when the expandable elements 8 are subjected to the transverse load (F). Preferably, the one or more force transfer elements 23 are substantially incompressible or undeformable. The one or more force transfer elements 23 can, for instance, be made of metal.

Figure 8:
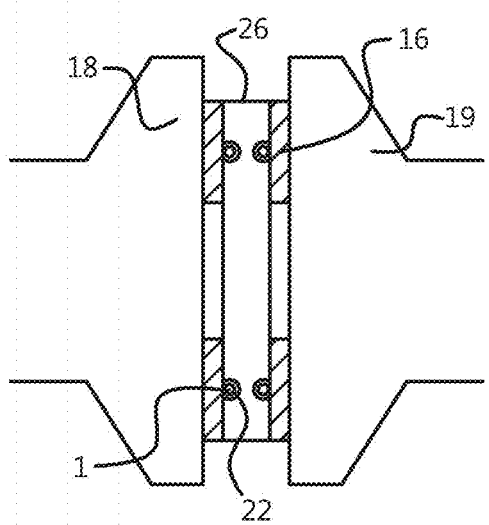
FIG. 8 shows another exemplary embodiment of a connection assembly of a first connection member, a second connection member and an aforementioned optical fiber sensing assembly, wherein the optical fiber sensing device is arranged in a substantially incompressible or undeformable structural element in the form of a metal spacer plate.

FIG. 8 shows another exemplary embodiment of a connection assembly of a first connection member 18, a second connection member 19 and an aforementioned optical fiber sensing assembly, wherein the optical fiber sensing device 1 is arranged in a substantially incompressible or undeformable structural element 26 in the form of a metal spacer plate. The metal spacer plate 26 can have a substantially round or circular shape. The optical fiber sensing device 1 may be arranged in a surface groove 22 arranged in a surface in the metal space plate 26. The optical fiber sensing device 1 and the groove 22 run in a circumferential direction along the surface of the metal spacer plate.

Figure 9:
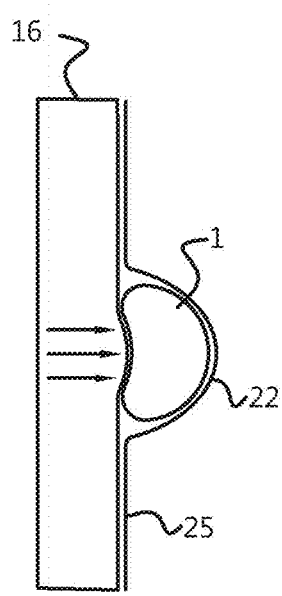
FIG. 9 shows a schematic depiction of the pressure or force being exerted on an optical sensing device arranged in a substantially incompressible or undeformable structural element due to the compression or deformation of an adjacent compressible or deformable element, such as a gasket.

FIG. 9 shows a schematic depiction of the pressure or force being exerted on an optical sensing device 1 arranged in a substantially incompressible or undeformable structural element due to the compression or deformation of an adjacent compressible or deformable element 16, such as a gasket 16. The compressible element 16, when subjected to compression, expands into the groove 22 to compress the one or expandable elements 8 of the optical fiber sensing device 1. Thus, the compression (or other stresses in the compressible element 16) can thus be measured.

It should be clear that the description above is intended to illustrate the operation of preferred embodiments of the invention, and not to reduce the scope of protection of the invention. Starting from the above description, many embodiments will be conceivable to the skilled person within the inventive concept and scope of protection of the present invention.

LIST OF REFERENCE NUMERALS

1. Optical fiber sensing device
2. Compressible or deformable element
3. Tubular element
4. Recess
5. Optical fiber
6. Light distortion structure
7. Fiber Bragg grating (FBG)
8. Expandable element
9. End of tubular element
10. Optical fiber section protruding from end of tubular element
11. Interior of tubular element
12. Optical fiber sensing system
13. Light source
14. Light sensor
15. Optical fiber sensing assembly
16. Gasket
17. Connection assembly
18. First connection member
19. Second connection member
20. Connection means
21. Line of compression or deformation
22. Groove
23. End cap
24. Longitudinal outer end of expandable element
25. Surface in which (surface) groove is arranged
26. Metal spacer plate
X=Longitudinal axis/direction
Y=Transverse direction
F=Transverse load
D1=diameter of expandable element
D2=diameter of tubular element

The invention claimed is:

1. Optical fiber sensing device (1) for sensing the distribution of the compression or deformation of a compressible or deformable element (2), comprising:

a substantially incompressible or undeformable tubular element (3) with a recess (4) extending in a length direction (X) of the tubular element, the recess being enclosed by the tubular element, an optical fiber (5) arranged in the recess, the optical fiber comprising one or more light distortion structures (6) and being expandable in the length direction of the recess, one or more expandable elements (8), having a higher compressibility or deformability than the tubular element in a transverse direction (Y), arranged at one or both ends (9) of the tubular element, the optical fiber being enclosed in the expandable elements, the expandable elements being arranged for expanding or contracting in the length direction, along with the optical fiber, when the expandable elements are subjected to a transverse load (F).

2. Optical fiber sensing device according to claim 1, wherein the tubular element is made of metal.

3. Optical fiber sensing device according to claim 1, wherein the expandable elements are made of a silicone material.

4. Optical fiber sensing device according to claim 1, wherein one or more optical fiber sections (10) protruding from one or both ends of the tubular element are embedded in the one or more expandable elements.

5. Optical fiber sensing device according to claim 1, wherein, in an uncompressed or undeformed state, the one or more expandable elements have a diameter (D1), i.e. in a plane perpendicular to the length direction, greater than the diameter (D2) of the tubular element.

6. Optical fiber sensing device according to claim 1, wherein the light distortion structure is arranged in the interior (11) of the tubular element.

7. Optical fiber sensing device according to claim 1, wherein the expandable elements have a tubular shape.

8. Optical fiber sensing device according to claim 1, wherein one or more force transfer elements (23) are fixed to the optical fiber, arranged adjacent to and in contact with one or more outer ends (24) of the one or more expandable elements to aid with transferring the expansion or contraction by the expandable elements in the length direction to the optical fiber when the expandable elements are subjected to the transverse load (F).

9. Optical fiber sensing device according to claim 8, wherein the one or more force transfer elements are substantially incompressible or undeformable.

10. Optical fiber sensing device according to claim 8, wherein the one or more force transfer elements are made of metal.

11. Optical fiber sensing assembly (15) including an optical fiber sensing device according to claim 1, including a compressible or deformable element or a structural element (18, 19), wherein the optical fiber sensing device is arranged in the compressible or deformable element or in the structural element in such a way, that the pressure distribution in a direction transverse to a length direction of the optical fiber sensing device is measured.

12. Optical fiber sensing assembly according to claim 11, wherein the compressible or deformable element is a gasket or seal (16).

13. Optical fiber sensing assembly according to claim 12, wherein the gasket is a non-metallic gasket.

14. Optical fiber sensing assembly according to claim 11, wherein the one or more expandable elements are arranged at one or more critical locations in the compressible or deformable element.

15. Optical fiber sensing assembly according to claim 11, wherein the structural element is substantially incompressible or undeformable.

16. Optical fiber sensing assembly according to claim 11, wherein the optical fiber sensing device is arranged in a surface groove (22) of the compressible or deformable element or in a surface groove of the structural element.

17. Optical fiber sensing assembly according to claim 16, wherein the surface groove, when viewed in a direction perpendicular to the surface, has the shape of a ring or a portion of a ring.

18. Optical fiber sensing assembly according to claim 11, wherein, in the transverse direction (Y), the one or more expandable elements extend beyond a surface (25) in which the surface groove (22) is arranged.

19. Optical fiber sensing system comprising:
an optical fiber sensing device (1) for sensing the distribution of the compression or deformation of a compressible or deformable element (2), comprising:
a substantially incompressible or undeformable tubular element (3) with a recess (4) extending in a length direction (X) of the tubular element, the recess being enclosed by the tubular element,
an optical fiber (5) arranged in the recess, the optical fiber comprising one or more light distortion structures (6) and being expandable in the length direction of the recess,
one or more expandable elements (8), having a higher compressibility or deformability than the tubular element in a transverse direction (Y), arranged at one or both ends (9) of the tubular element, the optical fiber being enclosed in the expandable elements, the expandable elements being arranged for expanding or contracting in the length direction, along with the optical fiber, when the expandable elements are subjected to a transverse load (F);
a light source (13) connected to one end of the optical fiber,
a light sensor (14) connected to the one end of the optical fiber, for measuring the wavelength or power reflected or transmitted by the one or more light distorting structures.

20. Method for sensing the distribution of the compression or deformation of a compressible or deformable element (2), using an optical fiber sensing assembly (15), the optical fiber sensing assembly including:
an optical fiber sensing device (1) for sensing the distribution of the compression or deformation of a compressible or deformable element (2), comprising:
a substantially incompressible or undeformable tubular element (3) with a recess (4) extending in a length direction (X) of the tubular element, the recess being enclosed by the tubular element,
an optical fiber (5) arranged in the recess, the optical fiber comprising one or more light distortion structures (6) and being expandable in the length direction of the recess,
one or more expandable elements (8), having a higher compressibility or deformability than the tubular element in a transverse direction (Y), arranged at one or both ends (9) of the tubular element, the optical fiber being enclosed in the expandable elements, the expandable elements being arranged for expanding or contracting in the length direction, along with the optical fiber, when the expandable elements are subjected to a transverse load (F);
a compressible or deformable element or a structural element (18, 19), wherein the optical fiber sensing device is arranged in the compressible or deformable element or in the structural element in such a way, that the pressure distribution in a direction transverse to a length direction of the optical fiber sensing device is measured;
comprising the steps of:
measuring one or more reflection wavelengths of the one or more light distortion structures, with the compressible or deformable element, the optical fiber and the expandable elements in an uncompressed or undeformed state,
measuring one or more reflection wavelengths of the one or more light distortion structures, with the compressible or deformable element, the optical fiber and the expandable elements in a compressed or deformed state,
correlating the expansion of the optical fiber and/or the expandable elements in the length direction with the changes in the one or more reflection wavelengths with respect to the one or more reflection wavelengths of the one or more light distortion structures.

* * * * *